United States Patent [19]

Smith et al.

[11] Patent Number: 5,409,678

[45] Date of Patent: Apr. 25, 1995

[54] SEPARATIONS OF ACTINIDES, LANTHANIDES AND OTHER METALS

[75] Inventors: Barbara F. Smith; Gordon D. Jarvinen, both of Los Alamos, N. Mex.; Dale D. Ensor, Cookeville, Tenn.

[73] Assignee: The United States of America as represented by the Department of Energy, Washington, D.C.

[21] Appl. No.: 31,053

[22] Filed: Mar. 11, 1993

Related U.S. Application Data

[63] Continuation of Ser. No. 602,957, Oct. 22, 1990, abandoned.

[51] Int. Cl.⁶ .......................... C01G 1/00; C01F 1/00
[52] U.S. Cl. ........................................ 423/9; 423/10
[58] Field of Search ................................ 423/9, 10

[56] References Cited

U.S. PATENT DOCUMENTS

| 2,877,092 | 3/1959 | Reas | 423/9 |
| 4,215,009 | 7/1980 | Spaziante et al. | 252/184 |
| 4,396,556 | 8/1983 | Kern | 423/9 |
| 4,770,807 | 9/1988 | Musikas et al. | 423/9 |
| 4,867,951 | 9/1989 | Smith et al. | 423/9 |

OTHER PUBLICATIONS

Albert H. Alberts et al., "Host–Guest Complexation 15. Macrocyclic Acetylacetone Ligands For Metal Cations 1,2." Amer. Chem. Soc., 101.13, 3545–3553 (1979).

Albert H. Alberts et al., "Templated Syntheses Of Cyclic Acetylacetone Hosts, Their Affinities For Divalent Ions, And An Example Of A Slow Proton Transfer From Enol To Hydroxide Ion[1]," J. of the Amer. Chem. Soc., 99:11, 3880–3882 (May 25, 1977).

Iwao Tabushi et al., "Macrocyclic Hexaketone As A Specific Host Of Uranyl Ion," Tetrahedron Lett., 37, 3515–3518 (1979).

Dong Xue-Chang et al., "Synthesis of Some New Acyl Pyrazolone Type Chelating Agents," Acta Chimica Sinica China, 41, 848–852 (1983).

M. Y. Mirza et al., "Studies On The Extraction Of Ti(IV) and U(VI) With 1-Phenyl-3-Methyl-4-Benzoyl-Pyrazole-5-One From Different Mineral Acids. Separation of Thorium From Titanium, Uranium And are Earths," Radiochim Acta, vol. 27(1), pp. 47–50, (1980).

Yuan Liming et al., "Extraction Of Thorium With 4,4′-Nonanedioyl-Bis-(1-Phenyl-3-Methyl-5-Pyrazolone)," Chinese J. of Applied Chemistry, 6, 1–8 (1989).

D. Jiasheng, "The Extraction Of Uranium (VI) with 4,4′Decanedioyl-Bis-(1-Phenyl-3-Methyl-5-Pyrazolone)," Chinese J. of Nuclear and Radiochemistry (1985).

Primary Examiner—Edward A. Miller
Attorney, Agent, or Firm—Richard J. Cordovano; William A. Eklund; William R. Moser

[57] ABSTRACT

An organic extracting solution comprised of a bis(acylpyrazolone or a substituted bis(acylpyrazolone) and an extraction method useful for separating certain elements of the actinide series of the periodic table having a valence of four from one other, and also from one or more of the substances in a group consisting of hexavalent actinides, trivalent actinides, trivalent lanthanides, trivalent iron, trivalent aluminum, divalent metals, and monovalent metals and also from one or more of the substances in a group consisting of hexavalent actinides, trivalent actinides, trivalent lanthanides, trivalent iron, trivalent aluminum, divalent metals, and monovalent metals and also useful for separating hexavalent actinides from one or more of the substances in a group consisting of trivalent actinides, trivalent lanthanides, trivalent iron, trivalent aluminum, divalent metals, and monovalent metals.

6 Claims, 5 Drawing Sheets

SEPARATIONS OF ACTINIDES, LANTHANIDES AND OTHER METALS

This is a continuation of application Ser. No. 07/602,957, filed Oct. 22, 1990, now abandoned.

BACKGROUND OF THE INVENTION

This invention relates to the field of metal ion separation chemistry and, more particularly, to solvent extraction. This invention is the result of a contract with the Department of Energy (Contract No. W-7405-ENG-36).

Acidic effluent streams containing elements of the actinide series and lanthanide series of the periodic table are generated in certain nuclear energy applications, such as the processing of waste from light water nuclear reactors. Processing of certain ores produces acidic process streams containing metals from the actinide and lanthanide series. The actinides can exist in a hexavalent state, a tetravalent state, or a trivalent state. The lanthanides usually exist in the trivalent state. Most other metals which may be present in actinide-lanthanide systems are in the monovalent, divalent, or trivalent states. It is desirable to be able to separate any and all of these metal ions from one other for a variety of reasons. For example, in the processing of monazite ores that contain high levels of the tetravalent actinide metal, thorium, and many of the lanthanide metals, it is desirable to produce pure lanthanides by quantitatively separating the thorium from the lanthanides. Also, it is desirable to obtain the thorium in pure form. Further, it is often desired to perform separations for purposes of recycle, waste processing, and analytical characterization.

The 1,3-diketones have been extensively studied as extractants for actinide and lanthanide ions (see item 1 on the list below for the citation to the paper for this statement). The linking of multiple 1,3-diketone units to give compounds with increased binding constants for U(VI) and some lanthanide ions has been reported. Alberts and Cram (2, 3) prepared a series of linear and macrocyclic ligands containing two or three 1,5-substituted acetylacetone units. These tetradenate compounds showed increased formation constants for divalent ions, including U(VI), of two to four orders of magnitude when compared with the unlinked bidentate analog. The compound containing three acetylacetone units showed a corresponding increase of five to six orders of magnitude in the formation constants with La(III), Ce(III), and Cr(III) over the bidentate analog. Tabushi et al. (4) reported on the preparation and extraction properties of a macrocycle containing three 1,3-diketone units, but the bidentate analog was not directly compared in this study. Extraction data for U(VI) has been reported for the linked pyrazolone 4,4'-decanedioyl-bis(2,4-dihydro-5-methyl-2-phenyl-3H-pyrazol-3-one) by Jiasheng (5), but no comparison with the bidentate pyrazolone was made.

The full citations for the papers mentioned above are as follows.

1. Sekine, T. and Y. Hasegawa, *Solvent Extraction Chemistry*, Marcel Dekker Inc. New York, 1977, pp. 179–186, (this is a book).
2. Alberts, A. H. and D. J. Cram, J. Amer. Chem. Soc., 99, 8366 (1977).
3. Alberts, A. H. and D. J. Cram, J. Amer. Chem. Soc., 101, 3545 (1979).
4. Tabushi, I., Y. Kobuke, and T. Nishiya, Tetrahedron Lett., 37, 3515 (1979).
5. Jiasheng, D., *The Extraction of Uranium (VI) With 4,4'-decanedioyl-bis(2,4-dihydro-5-methyl-2-phenyl-3H-pyrazol-3-one)*, J. of Nuclear and Radiochemistry (1985).

SUMMARY OF THE INVENTION

This invention is an organic extracting solution comprised of a bis-(acyl pyrazolone) or a substituted bis-(acyl pyrazolone) and an extraction method useful for separating (a) certain elements of the actinide series of the periodic table having a valence of four from one other, and also from (b) one or more of the substances in a group consisting of hexavalent actinides, trivalent actinides, trivalent lanthanides, trivalent iron, trivalent aluminum, divalent metals, and monovalent metals and also useful for (c) separating hexavalent actinides from one or more of the substances in a group consisting of trivalent actinides, trivalent lanthanides, trivalent iron, trivalent aluminum, divalent metals, and monovalent metals. There is a particularly large selectivity, which is surprising and not at all predictable, for the tetravalent actinides over each other and over the hexavalent actinide.

In a representative embodiment, the invention is a method of separating tetravalent actinides from one or more of the substances in a group consisting of, hexavalent actinides, trivalent actinides, trivalent lanthanides, trivalent iron, trivalent aluminum, divalent metals, and monovalent metals, where said substances to be separated are in an aqueous mineral acid solution, said method comprising supplying said aqueous solution and an organic extracting solution to a multiple stage extraction apparatus for processing by means of a plurality of contacting and separating steps to produce an organic phase comprised of said tetravalent actinides and aqueous phase comprised of the balance of said substances, where said organic extracting solution is comprised of an organic solvent and a bis-(acyl pyrazolone) or a substituted bis-(acylpyrazolone), where the substituents are chosen from a class consisting of alkyl groups, substituted alkyl groups, aryl groups, substituted aryl groups, carbonyl groups, alkoxy groups, aroxy groups, amine groups, and resins, and where the acyl carbon atoms of the acyl pyrazolone units are linked by a chain consisting of one or more groups chosen from a class consisting of methylene groups, substituted methylene groups, oxygen, amine groups, carbonyl groups, phosphoryl groups, alkyl groups, aryl groups, arylethers, arylamines, alkylamines, and resins.

BRIEF DESCRIPTION OF THE DRAWINGS

The accompanying drawings, which are a part of the specification, show chemical compounds of the invention and present, in the form of graphs, selected results of the practice of the invention.

DETAILED DESCRIPTION OF THE DRAWINGS

Figure 1:
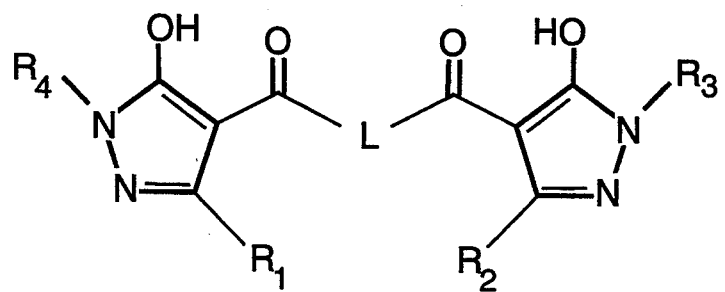
FIG. 1 depicts the general structural arrangement of the inventive compounds.

The general structural formula for the extracting agents of this invention is depicted in FIG. 1. The substituents $R_1$, $R_2$, $R_3$, and $R_4$ are chosen from a class consisting of hydrogen, alkyl groups, substituted alkyl groups, aryl groups, substituted aryl groups, carbonyl groups, alkoxy groups, aroxy groups, amine groups, and resins. Though four different substituents may be utilized on a particular extracting agent, it is preferable that $R_1$ and $R_2$ be the same and that $R_3$ and $R_4$ be the same.

Figure 2:
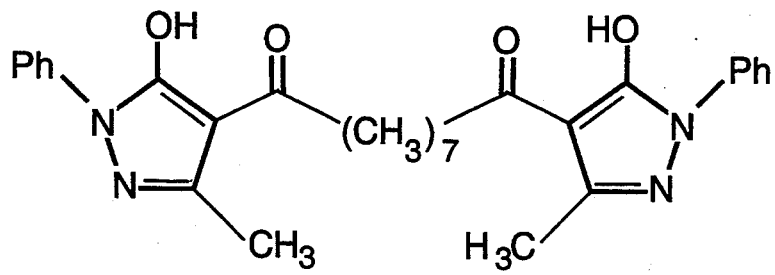
FIGS. 2 and 3 depict the structural arrangements of the compounds 4,4'-nonanedioyl-bis(2,4,-dihydro-5-methyl-2-phenyl-3H-pyrazol-3-one) ($H_2$NDBP) and bis(3-propyl-1-(4-carboamide-2,4-dihydro-5-methyl-2-phenyl-3H-pyrazol-3-one))-phenylphosphine oxide (PCPPO).

Still referring to FIG. 1, L denotes the linking chain which links together the acyl carbon atoms of the acyl pyrazolone units of the inventive extracting agents. L may consist of only one chemical group or many which are chosen from a class consisting of methylene groups, substituted methylene groups, oxygen, amine groups, carbonyl groups, phosphoryl groups, alkyl groups, aryl groups, arylethers, arylamines, alkylamines, and resins. In FIG. 2, L is $(CH_2)_7$.

Figure 3:
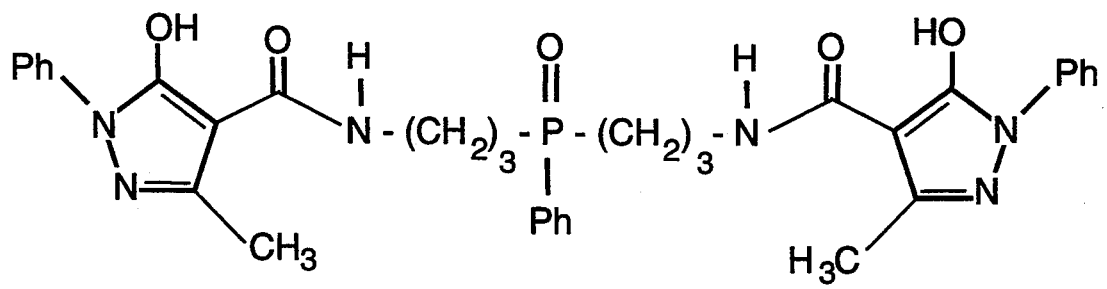

Extracting agents which were made and tested were compounds where substituents $R_1$ and $R_2$ were methyl groups, substituents $R_3$ and $R_4$ were phenyl rings and the linking chain L consisted only of methylene groups, with chain lengths of four, five, six, seven, or eight methylene groups. Most of the experimentation was done using 4,4'-nonanedioyl-bis(2,4,-dihydro-5-methyl-2-phenyl-3H-pyrazol-3-one), which may be abbreviated H$_2$NDBP This extracting agent has a linking chain of seven methylene groups. Bis(3-propyl-1-(4-carboamide-2,4-dihydro-5-methyl-2-phenyl-3H-pyrazol-3-one))-phenylphosphine oxide, abbreviated as PCPPO, whose structural formula is shown in FIG. 3, was synthesized but not tested.

The Jensen paper (see item 6 on the list below for the citation) provides a general procedure for preparing acyl pyrazolones. The Chang paper (7) provides a method for synthesizing H$_2$NDBP. The H$_2$NDBP prepared for the experimentation of this invention was prepared by the method of Chang, which was modified to the following procedure.

2,4-dihydro-5-methyl-2-phenyl-3H-pyrazol-3-one (Aldrich; 17.6 g) was dissolved in anhydrous dioxane (Eastman, distilled over lithium aluminum hydride; 300 mL) under a nitrogen atmosphere. Anhydrous Ca(OH)$_2$ (Baker; 15 g) was added all at once with rapid stirring. Nonanedioyldichloride (Aldrich; 11.4 g) was added dropwise at a rate that gave controlled refluxing. The reaction mixture was refluxed for 30 minutes more and then rapidly filtered while hot to remove excess Ca(OH)$_2$. The filter cake was washed several times with hot dioxane (20 mL). The filtrates were combined and after cooling yielded a crystalline solid. The solid was filtered, washed with cold dioxane (20 mL), and put into 250 mL of 2M HCl with stirring to break up the lumps. The product was filtered, washed with water, and further washed with methanol to remove a yellow impurity to yield 16.8 g (67% yield) of crude white product with mp 122°-122.5° C. The solid was recrystallized in a minimum of hot chloroform with methanol added to induce crystallization.

The full citations of the above mentioned papers are as follows.

6. Jensen, B. S., Acta. Chem. Scand., 13, 1668 (1959).
7. Xue-Chang, D., L. Fu-Chu, and Z. Yan-Lai, Acta Chimica Sinica China, 41, 848 (1983).

The extracting agents having methylene group linking chains of other lengths were made in the same manner as described above, but with the nonanedioyldichloride replaced with dodecanedioyldichloride, octanedioyldichloride, heptanediolydichloride, hexanedioyldichloride, or pentanedioyldichloride.

PCPPO was prepared as follows. In a Schlenk tube under Ar, 0.704 g of OPPh(CH$_2$CH$_2$CH$_2$NH$_2$)$_2$ was dissolved in 3 ml of dimethyl sulfoxide-d$_6$. 1.450 g (5.87 mol) of 4-carboethoxy-2,4-dihydro-5-methyl-2-phenyl-3H-pyrazole-one was added to give a clear light yellow solution. The resulting solution was placed in an oil bath heated to 154° C. The reaction solution gradually turned a dark red color. After 1 hour at 154°-157° C., the Schlenk tube was removed from the oil bath. The crude reaction solution was mixed with 10 ml of silica gel (Sigma Chemical, Inc. chromatographic grade type 1, 60–200 mesh) and the volatiles removed under vacuum at 80° C. The resulting orange silica gel was added to a 45×2.5 m column of silica gel made up with CHCl$_3$. Two yellow bands were eluted with about 1.2 L of CHCl$_3$. Elution was then started with 10% EtOH/CHCl$_3$. Two small yellow bands and an orange-pink band were eluted with about 1.0 L of 10% EtOH/CHCl$_3$. Elution was continued with 20% EtOH/CHCl$_3$ and a light pink band was eluted ($\approx$400 ml). Another light pink band was eluted with 30% EtOH/CHCl$_3$ ($\approx$400ml), 500 ml of 50% EtOH/CHCl$_3$ followed by 1.0 L of 70% EtOH/CHCl$_3$ eluted a broad pink band. This solution was rotovaped and further vacuum treated to give 0.353 g of light pink oil which crystallized to give a light pink solid. IR and proton NMR data are consistent with formulated product.

A starting material for PCPPO [OPPh(CH$_2$CH$_2$CH$_2$NH$_2$)$_2$] was prepared as follows. In a 250 ml flask, 10.32 g (46.0 mmol) of PPh(CH$_2$CH$_2$CH$_2$NH$_2$)$_2$ (Strem Chemicals, Inc.) was weighed out and dissolved in 125 ml of reagent grade methanol. In an addition funnel, 5.2 g of 30% H$_2$O$_2$ was dissolved in 50 ml of methanol. The H$_2$O$_2$ solution was added dropwise to the rapidly stirred solution of the phosphine over 40 minutes. The reaction solution warmed to about 45° C. during the addition. After stirring for 42 hours the solution was mixed with several grams of MnO$_2$ for 2 hours to decompose excess H$_2$O$_2$. The MnO$_2$ was then removed by filtration and the volatiles removed from this clear solution under vacuum. A clear off-white oil resulted (11.02 g, 99%) yield. Identity was verified by proton NMR and IR spectra.

Using the above examples, those skilled in the art will be able to prepare the extracting agents of the present invention.

Compounds analogous to H$_2$NDBP containing four, five, six, and eight carbon chains linking two acyl pyrazolone units have also been synthesized by similar procedures. Many of the extraction studies have used H$_2$NDBP because of its relatively high solubility in toluene and other organic solvents. The compounds with four, five, and eight carbon linking units are less soluble than H$_2$NDBP. Third phase formation during the extraction occurs more readily for the four and five methylene-linked compounds than for the seven and eight carbon analogues. This requires more care in obtaining meaningful extraction data. The six carbon-linked compound was almost insoluble in all the organic solvents tried and therefore extraction studies could not be done.

EXAMPLE 1

Figure 4:
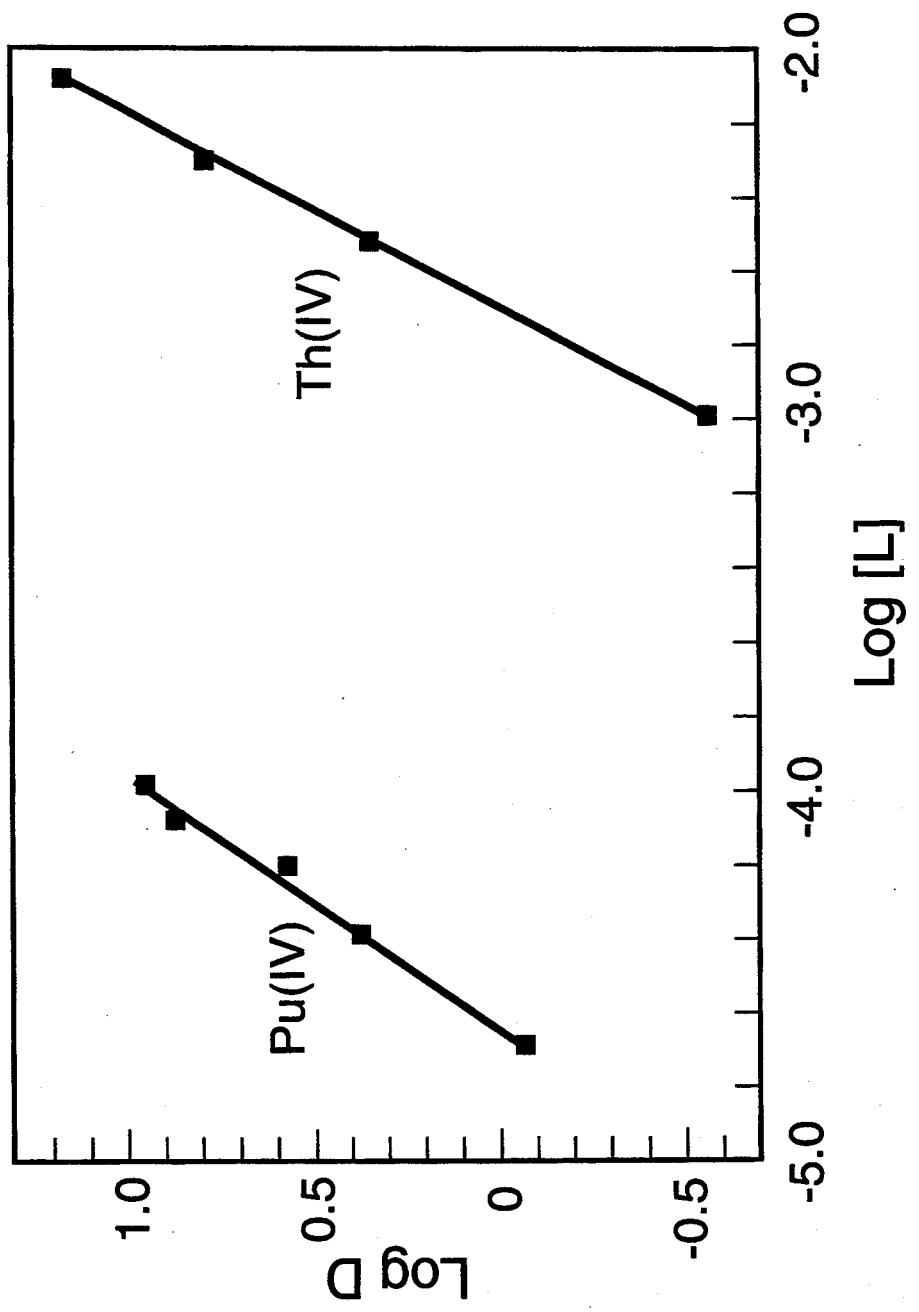
FIG. 4 shows separation efficiency for the separation of tetravalent plutonium from tetravalent thorium.

FIG. 4 shows the results of a series of extractions using H$_2$NDBP in toluene. The log of the distribution coefficient (D) for plutonium (Pu) and for thorium (Th) is plotted against the log of the molar concentration of H$_2$NDBP in the toluene solution. The aqueous solution consisted of 1 molar nitric acid containing small concentrations of Pu(IV) and Th(IV). The H$_2$NDBP gives a good separation of the tetravalent metals under these conditions with Pu(IV) being extracted more than 100 times better than Th(IV) at ligand concentrations between $10^{-4.8}$ and $10^{-3.8}$ molar.

EXAMPLE 2

Figure 5:
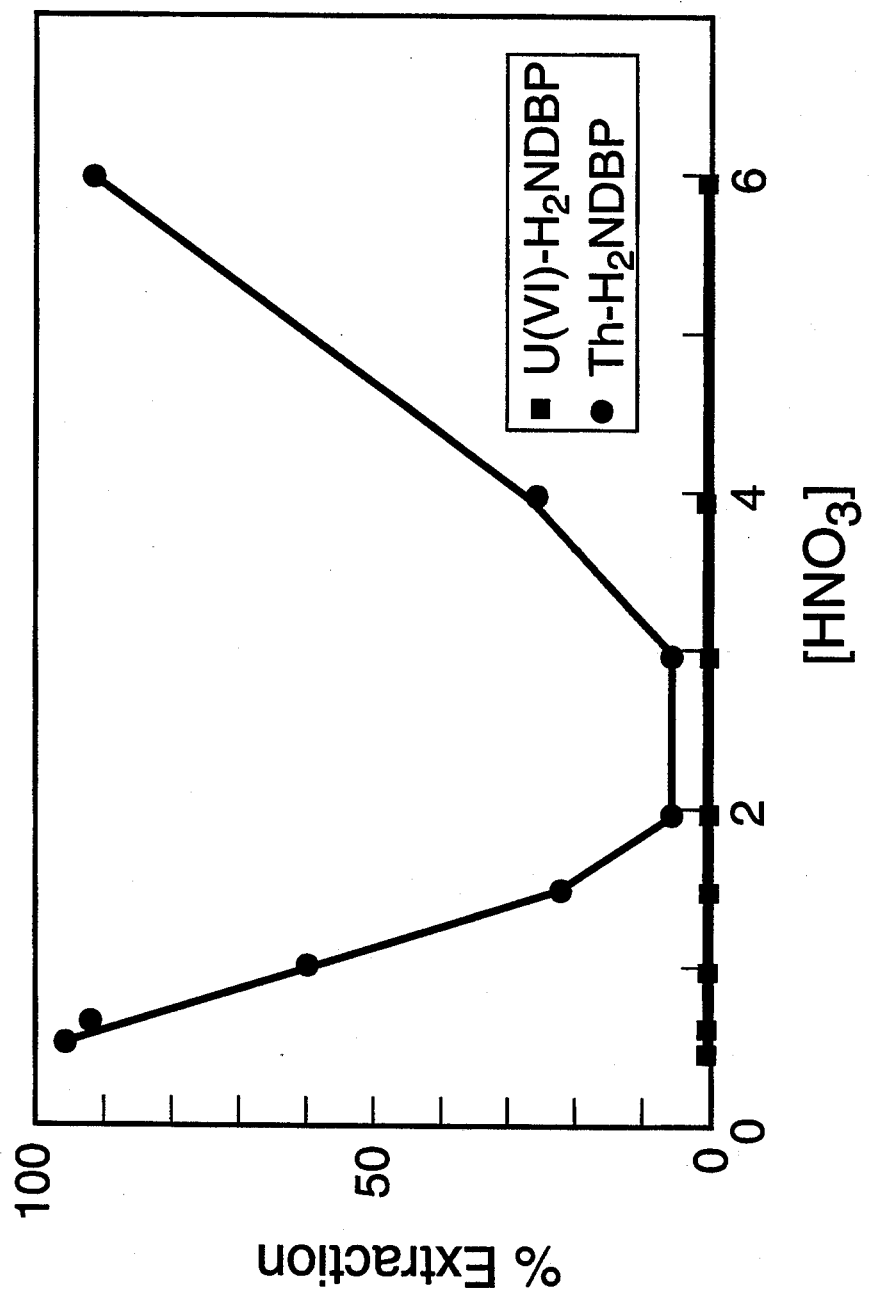
FIG. 5 shows the separation efficiency for the separation of tetravalent thorium from hexavalent uranium.

FIG. 5 demonstrates the dramatic separation of a tetravalent actinide [Th(IV)] from a hexavalent actinide [(U(VI)] using H$_2$NDBP in toluene. It shows the results of the extraction of Th(IV) and U(VI) at acid concentrations from 0.5 to 6M and 0.003 molar H$_2$NDBP. The results show that U(VI) is not extracted significantly (less than 1% extraction) by H$_2$NDBP over this entire range. The H$_2$NDBP showed different behavior with Th(IV). The percentage of extraction initially decreases from greater than 90% at 0.5M HNO$_3$ to a minimum of less than 5% at about 2.5M HNO$_3$ and then increases to greater than 90% at 6M acid. This change probably indicates that a different extraction mechanism is operating at the higher acid concentrations as compared to the lower acid concentration region. Clearly indicated is a good separation of Th(IV) from U(VI) at about 0.5M and 6M nitric acid and a region for back extraction of Th(IV) at 2–3M nitric acid.

EXAMPLE 3

Figure 6:
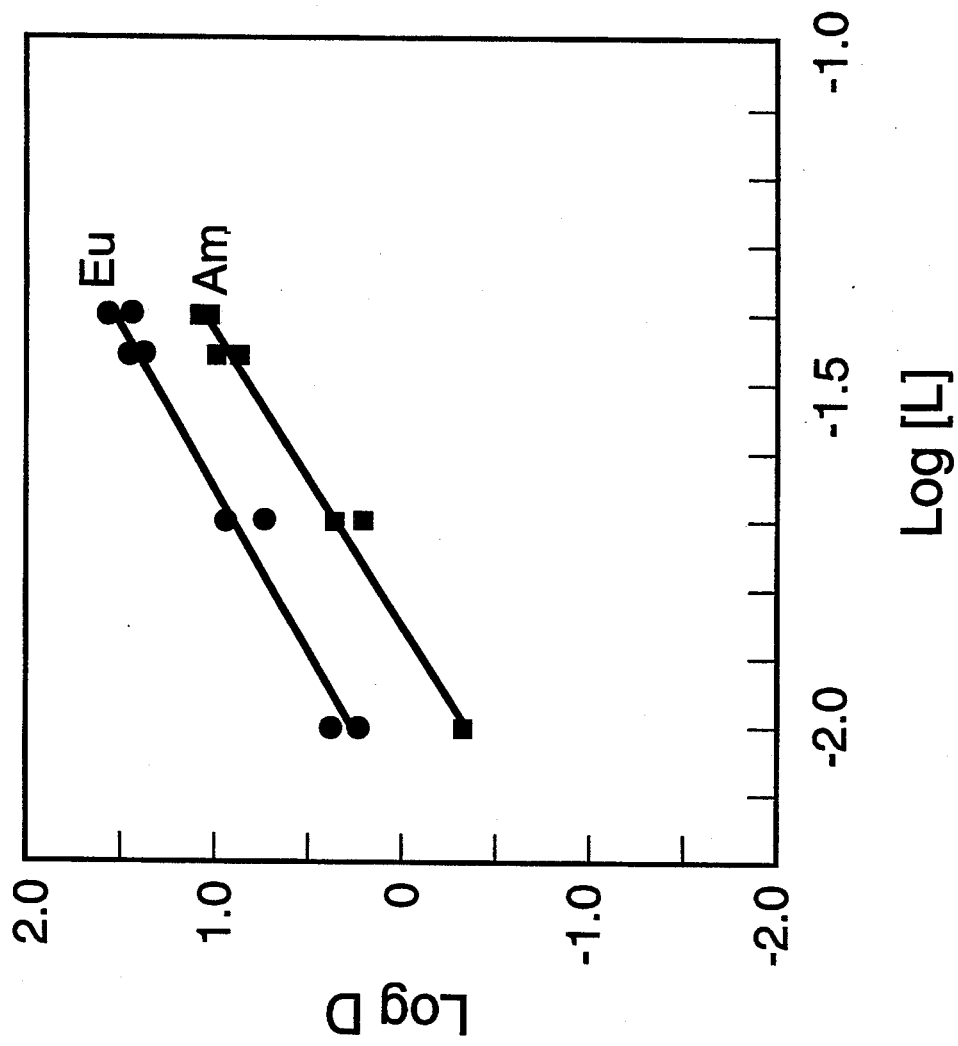
FIG. 6 shows the ready separation of tetravalent actinides from trivalent actinides and trivalent lanthanides. It shows similarity of the extraction behavior of trivalent americium and europium and that significant extraction of these trivalent metal ions only occurs at much higher pH than for thorium (IV).

FIG. 6 demonstrates the extraction behavior of trivalent Eu and Am, which are quite similar to each other, indicating that the trivalent lanthanides and actinides will have similar D values. When compared to the much higher acid concentrations used for the Th(IV) extraction in FIG. 5, the trivalent Am and Eu are not significantly extracted at 1 molar acid. The log of the distribution coefficient (D) for europium (Eu) and for americium (Am) is plotted against the log of the molar concentration of H$_2$NDBP in the toluene solution. The aqueous solution consisted of $10^{-2.84}$ molar perchloric acid with enough LiClO$_4$ added to bring the perchlorate concentration to 0.1 molar. The aqueous solution also contained tracer concentrations of Eu and Am. This demonstrates the ready separation of trivalent actinides and lanthanides from tetravalent actinides.

EXAMPLE 4

Figure 7:
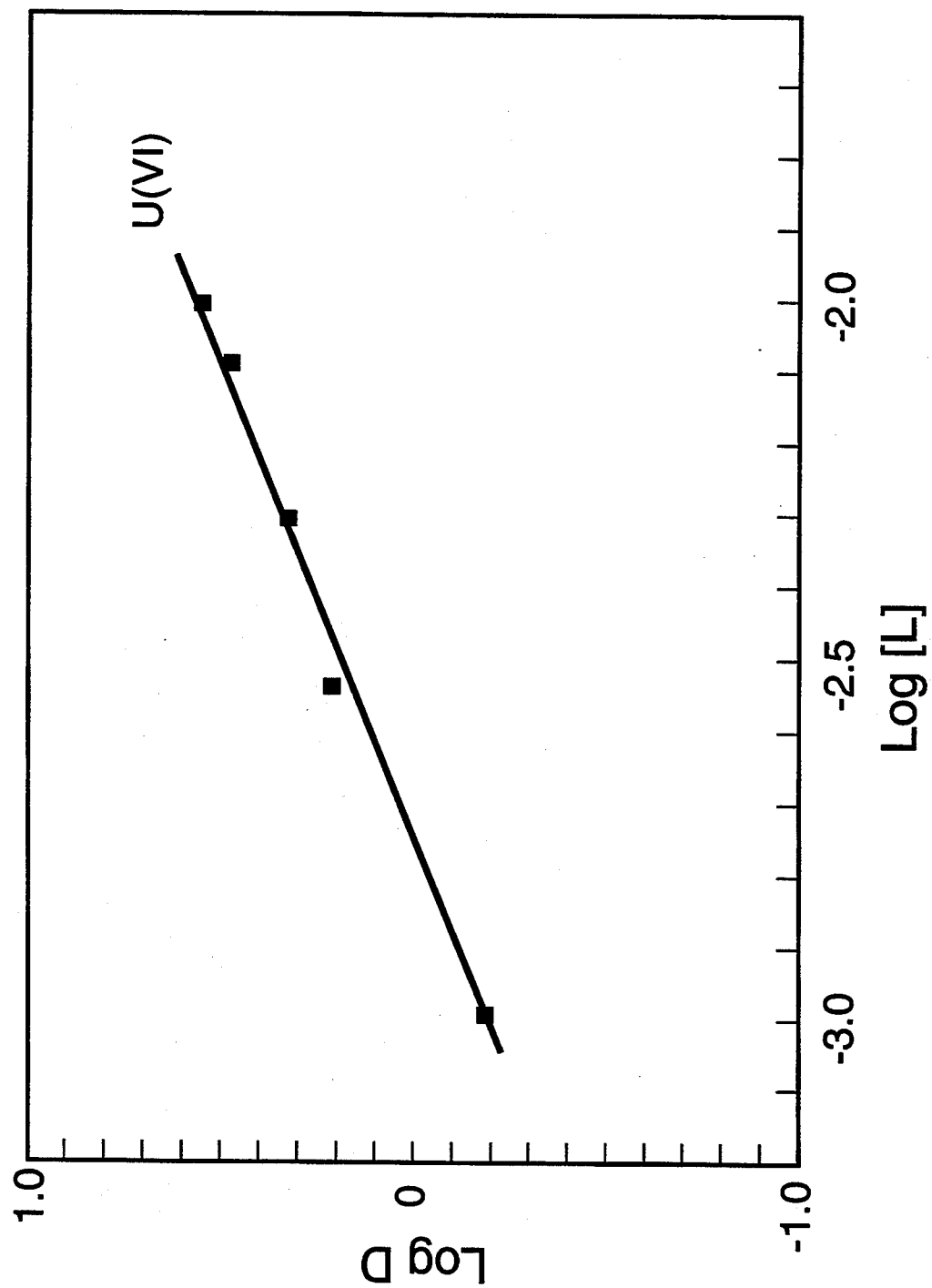
FIG. 7 shows the ready separation of hexavalent actinides from trivalent actinides.

FIG. 7 shows the extraction behavior of hexavalent U. When compared to FIG. 6, it demonstrates the ready extraction of U(IV) at higher acid concentration and lower H$_2$NDBP concentration than the extraction of trivalent actinides and lanthanides. The log of the distribution coefficient (D) for U(VI) is plotted against the log of the molar concentration of H$_2$NDBP in the toluene solution. The aqueous solution consisted of $10^{-2.0}$ molar nitric acid with enough sodium nitrate added to bring the nitrate concentration to 0.1 molar. The aqueous solution also contained $10^{-4}$ molar U(VI). This shows that there is ready separation of trivalent actinides from hexavalent actinides.

EXAMPLE 5

Iron (III) nitrate and aluminum (III) nitrate were dissolved in 1.0M nitric acid and contacted with a solution of 0.15M H$_2$NDBP in toluene. No extraction (D less than 0.001) of iron and aluminum was observed. As shown in FIG. 4, Th(IV) is well extracted (D=1–20) from 1.0M nitric acid at much lower H$_2$NDBP concentrations ($10^{-2.6}$ to $10^{-2.2}$M). Thus, the tetravalent actinides can be readily separated from trivalent iron and aluminum.

Because it is the carbonyl oxygens in the pyrazolone radicals that are doing the actual binding of the metal ions to effect the complexation, the pyrazolones can be linked by a variety of chemical groups or linking units. These units can dramatically effect the complexation and physical characteristics of the materials of the invention. Linking units can cause steric effects that can potentially enhance or decrease the effect of the separation. For example, the seven methylene linked pyrazolone is more selective for the separation of thorium from uranium than the eight methylene linked pyrazolone. The linking unit can effect the solubility of the compounds of the invention. For example, the seven methylene unit has greater than ten times the toluene solubility of the eight methylene unit linked pyrazolone and the compound linked with six methylene units (—CH$_2$—CH$_2$—CH$_2$—CH$_2$—CH$_2$—CH$_2$—) has low solubility in many organic solvents. Replacing two carbons in the unit with two oxygens (—CH$_2$—O—CH$_2$—CH$_2$—O—CH$_2$—) dramatically increases the solubility of the compounds of the invention. Variation of the linking chain may be desirable to affect attachment to other units, influence steric factors and physical properties in the compounds of the invention.

Variation in the R-groups on the pyrazolone ring may be desirable to effect physical changes in the compound (e.g. enhanced solubility in certain solvent systems). Variable R would allow for attachment to other materials. Electronic effects upon the complexation of the donor oxygens can be varied by varying the R groups. Electronic effects can have a direct effect on the pKa or acidity of the compounds which has a direct effect upon the optimum acid region for extraction. For example, from studies with the single pyrazolone extractants, when a substituent of the R group was changed from a methoxy to trifluoromethyl group, the extraction or distribution coefficient was changed 3000 times and the pKa changed more than a factor of 2.

As used herein, an aryl group is univalent radical derived from an aromatic compound which is a five or six member ring compound or fused ring compound. An aroxy group is an aryl group attached to an oxygen atom having a free valence. An alkoxy group is an alkyl group attached to an oxygen atom having a free valence. An alkylamine group is a nitrogen atom having one free valence, an alkyl group attached to it, and another substituent attached to it which may be hydrogen, an alkyl group, or an aryl group. A carbonyl group is a carbon atom having one free valence, an oxygen atom double bonded to it, and a hydrogen, alkyl, aryl, aroxy, alkoxy, alkylamine, or hydroxyl, group attached to it.

The above-defined terms, such as alkyl and aryl, are to be understood to include groups having substituents in place of hydrogen atoms; for example, the term aryl group includes an aryl group having an alkyl group replacing one of its hydrogen atoms.

An extracting agent of this invention such as $H_2NDBP$ is dissolved in an organic solvent to provide an extracting solution. The common solvents such as aromatic hydrocarbons, alkane solvents, and chlorinated hydrocarbons may be used. Specific examples include chloroform, toluene, and xylene.

It should be noted that the process according to the invention can be put into effect in any conventional solvent extraction apparatus, such as pulsed columns, centrifugal contractor, mixer-settlers, and counter-current membrane extractors.

The compounds of the present invention have additional applications which utilize properties described herein. Actinide chelating materials for use in waste minimization and other waste processing applications and analytical applications have been prepared. $H_2NDBP$ in an organic solvent has been absorbed into or onto various polymers and ceramic materials. Future plans include chemically bonding the compound to polymers and ceramics. These chelating materials may be used to remove actinides from a waste stream and the actinides can them be flushed from the chelating materials, thus reducing the volume of the contaminated waste stream by 1-4 orders of magnitude. Actinide sensors may also be prepared by incorporating the compounds into or onto polymers, ceramics, and other materials. Changes in properties such as weight, color, and conductivity may be monitored as indications of the presence of actinides in aqueous streams. For example, a sensor comprised of $H_2NDBP$ incorporated in a film deposited on a piezoelectric crystal would exhibit a frequency change as actinides bind with the $H_2NDBP$ and increase the weight of the film. Also, changes in the ultraviolet or visible light absorption of a film with $H_2NDBP$ incorporated in it deposited on an optical fiber can be used to monitor actinide ion concentrations in solutions contacting the film. For example, U(VI) produces a characteristic orange color on binding to $H_2NDBP$. In U.S. Pat. Nos. 4,867,951 and 4,923,630, very good extractive separations of trivalent actinides from trivalent lanthanides using single unlinked monothio-1,3-dicarbonyl compounds were disclosed. This leads to an expectation that dithio analogs of the linked pyrazolones described above will possess attractive binding constants and provide better separations than the systems described in the patents above.

In Examples 1, 2, and 4 uranium was present in the aqueous solution in a concentration of $10^{-4}$ moles per liter of solution and thorium was present in the aqueous solution at same concentration. Plutonium was present in the aqueous solution in a concentration of $10^{-5}$ moles per liter of solution. Mixtures of the extracting solution and the aqueous solution were agitated for about 15 to 30 minutes and then placed in a centrifuge. After centrifugation, the resulting organic and aqueous phases were separated by decantation. All experimentation was done at room temperature and atmospheric pressure. All concentrations were determined by means of alpha spectrometry or visible spectroscopy.

In Example 3, europium was present in the aqueous solution in a concentration of $10^{-8}$ moles per liter of solution and americium was present in the aqueous solution at the same concentration. The elements were purchased from New England Nuclear. Mixtures of the extracting solution and the aqueous solution were agitated for about 15 to 30 minutes and then placed in a centrifuge. After centrifugation, the resulting organic and aqueous phases were separated by decantation. All experimentation was done in Teflon ® vessels at room temperature and atmospheric pressure. All concentrations were determined by means of gamma spectrometry.

In Example 5, aluminum was present in the aqueous solution in a concentration of $10^{-3}$ moles per liter of solution and iron was present in the aqueous solution at the same concentration. Mixtures of the extracting solution and the aqueous solution were agitated for about 15 to 30 minutes and then placed in a centrifuge. After centrifugation, the resulting organic and aqueous phases were separated by decantation. All experimentation was done in Teflon ® vessels at room temperature and atmospheric pressure. All concentrations were determined by means of inductively coupled plasma-atomic emission spectroscopy.

The distribution coefficient, D, for an element is the number obtained by dividing the concentration of the element in the extracting solution by the concentration of the element in the aqueous solution, the concentrations being measured after the solutions are contacted with one another and separated.

It is well established from many previous studies that 1,3-dicarbonyl extracting agents will extract trivalent metal ions over divalent metal ions and divalent metal ions over monovalent metal ions. Since the $H_2NDBP$ extraction system has been shown to extract tetravalent and hexavalent metals more strongly than trivalent actinides, lanthanides, iron, and aluminum, it follows that the tetravalent and hexavalent actinides will be readily separated from divalent and monovalent metals in the practice of this invention.

In light of the above information, it can be appreciated that the experimental results obtained combined with the knowledge of those skilled in the art teaches separations which have not been experimentally demonstrated. For example, it has been demonstrated that Pu (IV) can be separated from Th (IV) using an extractive agent of this invention. This experimental result teaches that PU (IV) can be separated from U (IV), Np (IV), and Pa (IV).

What is claimed is:

1. A method of separating tetravalent actinides from one or more of the substances in the group consisting of hexavalent actinides, trivalent actinides, trivalent lanthanides, trivalent iron, and trivalent aluminum, said method comprising carrying out one or more contacting and separating steps, where each step comprises contacting an aqueous mineral acid solution containing tetravalent actinides and one or more of the substances in the group consisting of hexavalent actinides, trivalent actinides, and trivalent lanthanides, trivalent iron, and trivalent aluminum with an organic extracting solution to form a mixture and separating said mixture into an organic phase comprised of said tetravalent actinides and an aqueous phase comprised of said substances, where said organic extracting solution is comprised of an organic solvent which is insoluble in water and a bis-acylpyrazolone or substituted bis-acylpyrazolone having the structural formula

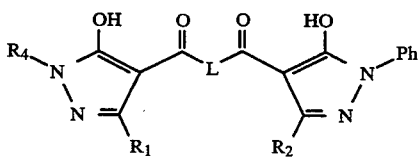

where the substituents $R_1$, $R_2$, $R_3$, and $R_4$ are chosen from the group consisting of alkyl groups, aryl groups, carbonyl groups, alkoxy groups, aroxy groups, and amine groups, and where the linking chain designated by L consists of one of the linking chains in the group consisting of:

—$(CH_2)_n$—, where n equals 1 to 15;

—$(CH_2)_n$—C(O)—$(CH_2)_m$, where n equals 1 to 7 and m equals 1 to 7;

—$(CH_2)_n$—C(O)—$(CH_2)_p$—C(O)—$(CH_2)_m$—, where n equals 1 to 7 and m equals 1 to 7 and p equals 1 to 4;

—$(CH_2)_n$—,N(R)—$(CH_2)_m$—, where n equals 1 to 7 and m equals 1 to 7 and R is alkyl or aryl;

—$(CH_2)_n$—N(R)—$(CH_2)_p$—N(R)—$(CH_2)_m$—where n equals 1 to 7 and m equals 1 to 7 and p equals 1 to 5 and R is alkyl or aryl;

—$(CH_2)_n$—O—$(CH_2)_m$—, where n equals 1 to 7 and m equals 1 to 7;

—$(CH_2)_n$—O—$(CH_2)_p$—O—$(CH_2)_m$—, where n equals 1 to 7 and m equals 1 to 7 and p equals 1 to 4;

—$(CH_2)_n$—$O_x$—P(O) (R)—$O_x$—$(CH_2)_m$—, where x equals 0 to 1 and n equals 1 to 7 and m equals 1 to 7 and R is alkyl, aryl, alkoxy or aryloxy;

—$(CH_2)_n$-aryl-$(CH_2)_m$—, where n equals 0 to 7 and m equals 0 to 7;

—$(CH_2)_n$O-aryl-O—$(CH_2)_m$—, where n equals 0 to 7 and m equals 0 to 7;

—N(R)—$(CH_2)_n$—N(R)—, where n equals 1 to 15 and R is H or alkyl;

—N(R)—$(CH_2)_n$—C(O)—$(CH_2)_m$—N(R)—, where n equals 1 to 7 and m equals 1 to 7 and R is H or alkyl;

—N(R)—$(CH_2)_n$—C(O)—$(CH_2)_p$—c(O)—$(CH_2)_m$—N(R)—, where n equals 1 to 7 and m equals 1 to 7 ad p equals 1 to 4 and R is H or alkyl;

—N(R)—$(CH_2)_n$—N(R)—$(CH_2)_m$—N(R)—, where n equals 1 to 7 and m equals 1 to 7 and R is alkyl or aryl or H;

—N(R)—$(CH_2)_n$—N(R)—$(CH_2)_p$—N(R)—$(CH_2)_m$—N(R)—, where n equals 1 to 7 and m equals 1 to 7 and p equals 1 to 5, and R is alkyl or aryl or H;

—N(R)—$(CH_2)_n$—O—$(CH_2)_m$—N(R)—, where n equals 1 to 7 and m equals 1 to 7 and R is H or alkyl;

—N(R)—$(CH_2)_n$—O—$(CH_2)_p$—O—$(CH_2)_m$—N(R)—, where n equals 1 to 7 and m equals 1 to 7 and p equals 1 to 4 and R is H or alkyl;

—N(R)—$CH_2)_n$—O—$_x$—P(O) (R')—O—$(CH_2)_m$—N(R)—, where x equals 0 or 1 and n equals 1 to 7 and m equals 1 to 7 and R is alkyl or H and R' is alkyl, aryl, alkoxy or aryloxy;

—N(R)—$(CH_2)_n$-aryl-$(CH_2)_m$—N(R)—, where n equals 0 to 7 and m equals 0 to 7 and R is H or alkyl;

—N(R)—$(CH_2)_n$—O-aryl-O—$(CH_2)_m$—N(R)—, where n equals 1 to 7 and m equals 1 to 7 and R is H or alkyl;

—O—$(CH_2)_n$—O—, where n equals 1 to 15;

—O—$(CH_2)_n$—C(O)—$(CH_2)_m$—O—, where n equals 1 to 7 and m equals 1 to 7;

—O—$(CH_2)_n$—C(O)—$(CH_2)_p$—C(O)—$(CH_2)_m$—O—, where n equals 1 to 7 and m equals 1 to 7 and p equals 1 to 4;

—O—$(CH_2)_n$—N(R)—$(CH_2)_m$—O—, where n equals 1 to 7 and m equals 1 to 7 and r is alkyl or alkyl;

—O—$(CH_2)$-N(R)—$(CH_2)_p$—N(R)—$(CH_2)_m$—O—, where n equals 1 to 7 and m equals 1 to 7 and p equals 1 to 5 and R is alkyl or aryl;

—O—$(CH_2)_n$—O—$(CH_2)_m$—O—, where n equals 1 to 7 and m equals 1 to 7;

—O—$(CH_2)_n$—O—$(CH_2)_p$—O—$(CH_2)_m$—O—, where n equals 1 to 7 and m equals 1 to 7 and p equals 1 to 4;

—O—$(CH_2)_n$—$O_x$—P(O) (R)—$O_x$—$(CH_2)_m$—O—, where n equals 1 to 7 and m equals 1 to 7 and R is alkyl, aryl, alkoxy or aryloxy;

—O—$(CH_2)_n$-aryl-$(CH_2)_m$—O—, where n equals 0 to 7 and m equals 0 to 7;

—O—$(CH_2)_n$-aryl-O—$(CH_2)_m$—O—, where n equals 1 to 7 and m equals 1 to 7 and;

—O—$(CH_2)_n$—N(R)-aryl-N(R)—$(CH_2)_m$—O—, where n equals 1 to 7 and m equals 1 to 7 and R is alkyl.

2. The method of claim 1 where said substituted bis-acylpyrazolone is 4,4'-nonanedioyl-bis(2,4-dihydro-5-methyl-2-phenyl-3H-pyrazol-3-one).

3. The method of claim 1 where said substituted bis-acylpyrazolone is bis(3-propyl-1-(4-carboamide-2,4-dihydro-5-methyl-2-phenyl-3H-pyrazol-3-one))-phenylphosphine oxide.

4. A method of separating tetravalent plutonium from one or more of the substances in the group of tetravalent actinides consisting of thorium, neptunium, uranium, and protactinium, said method comprising carrying out one or more contacting and separating steps, where each step comprises contacting an aqueous mineral acid solution containing tetravalent plutonium and one or more of the substances in the group of tetravalent actinides consisting of thorium, neptunium, uranium, and protactinium with an organic extracting solution to form a mixture and separating said mixture into an organic phase comprised of said tetravalent plutonium and an aqueous phase comprised of said substances, where said organic extracting solution is comprised of an organic solvent which is insoluble in water and a bis-acylpyrazolone or a substituted bis-acylpyrazolone having the structural formula

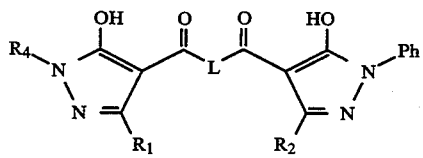

where the substituents $R_1$, $R_2$, $R_3$, and $R_4$ are chosen from the group consisting of alkyl groups, aryl groups, carbonyl groups, alkoxy groups, aroxy groups, and amine groups, and where the linking chain designated by L consists of one of the linking chains in the group consisting of:

—$(CH_2)_n$—, where n equals 1 to 15;

—$(CH_2)_n$—C(O)—$(CH_2)_m$, where n equals 1 to 7 and m equals 1 to 7;

—$(CH_2)_n$—C(O)—$(CH_2)_p$—C(O)—$(CH_2)_m$—, where n equals 1 to 7 and m equals 1 to 7 and p equals 1 to 4;

—$(CH_2)_n$—,N(R)—$(CH_2)_m$—, where n equals 1 to 7 and m equals 1 to 7 and R is alkyl or aryl;

—$(CH_2)_n$—N(R)—$(CH_2)_p$—N(R)—$(CH_2)_m$—, where n equals 1 to 7 and m equals 1 to 7 and p equals 1 to 5 and R is alkyl or aryl;

—$(CH_2)_n$—O—$(CH_2)_m$—, where n equals 1 to 7 and m equals 1 to 7;

—$(CH_2)_n$—O—$(CH_2)_p$—O—$(CH_2)_m$—, where n equals 1 to 7 and m equals 1 to 7 and p equals 1 to 4;

—$(CH_2)_n$—$O_x$—P(O) (R)—$O_x$—$(CH_2)_m$—, where x equals 0 to 1 and n equals 1 to 7 and m equals 1 to 7 and R is alkyl, aryl, alkoxy or aryloxy;

—$(CH_2)_n$-aryl-$(CH_2)_m$—, where n equals 0 to 7 and m equals 0 to 7;

—$(CH_2)_n$—O-aryl-O—$(CH_2)_m$—, where n equals 0 to 7 and m equals 0 to 7;

—N(R)—$(CH_2)_n$—N(R)—, where n equals 1 to 15 and R is H or alkyl;

—N(R)—$(CH_2)_n$—C(O)—$(CH_2)_m$—N(R)—, where n equals 1 to 7 and m equals 1 to 7 and R is H or alkyl;

—N(R)—$(CH_2)_n$—C(O)—$(CH_2)_p$—C(O)—$(CH_2)_m$—N(R)—, where n equals 1 to 7 and m equals 1 to 7 and p equals 1 to 4 and R is H or alkyl;

—N(R)—$(CH_2)_n$—N(R)—$(CH_2)_m$—N(R)—, where n equals 1 to 7 and m equals 1 to 7 and R is alkyl or aryl or H;

—N(R)—$(CH_2)_n$—N(R)—$(CH_2)_p$—N(R)—$(CH_2)_m$—N(R)—, where n equals 1 to 7 and m equals 1 to 7 and p equals 1 to 5, and R is alkyl or aryl or H;

—N(R)—$(CH_2)_n$—O—$(CH_2)_m$—N(R)—, where n equals 1 to 7 and m equals 1 to 7 and R is H or alkyl;

—N(R)—$(CH_2)_n$—O—$(CH_2)_p$—O—$(CH_2)_m$—N(R)—, where n equals 1 to 7 and m equals 1 to 7 and p equals 1 to 4 and R is H or alkyl;

—N(R)—$(CH_2)_n$—O—$_x$—P(O) (R')—O—$(CH_2)_m$—N(R)—, where x equals 0 or 1 and n equals 1 to 7 and m equals 1 to 7 and R is alkyl or H and R' is alkyl, aryl, alkoxy or aryloxy;

—N(R)—$(CH_2)_n$-aryl-$(CH_2)_m$—N(R)—, where n equals 0 to 7 and m equals 0 to 7 and R is H or alkyl;

—N(R)—$(CH_2)_n$—O-aryl-O—$(CH_2)_m$—N(R)—, where n equals 1 to 7 and m equals 1 to 7 and R is H or alkyl;

—O—$(CH_2)_n$—O—, where n equals 1 to 15;

—O—$(CH_2)_n$—C(O)—$(CH_2)_m$—O—, where n equals 1 to 7 and m equals 1 to 7;

—O—$(CH_2)_n$—C(O)—$(CH_2)_p$—C(O)—$(CH_2)_m$—O—, where n equals 1 to 7 and m equals 1 to 7 and p equals 1 to 4;

—O—$(CH_2)_n$—N(R)—$(CH_2)_m$—O—, where n equals 1 to 7 and m equals 1 to 7 and R is alkyl or aryl;

—O—$(CH_2)_n$—N(R)—$(CH_2)_p$—N(R)—$(CH_2)_m$—O—, where n equals 1 to 7 and m equals 1 to 7 and p equals 1 to 5 and R is alkyl or aryl;

—O—$(CH_2)_n$—O—$(CH_2)_m$—O—, where n equals 1 to 7 and m equals 1 to 7;

—O—$(CH_2)_n$—O—$(CH_2)_p$—O—$(CH_2)_m$—O—, where n equals 1 to 7 and m equals 1 to 7 and p equals 1 to 4;

—O—$(CH_2)_n$—$O_x$—P(O) (R)—$O_x$—$(CH_2)_m$—O—, where n equals 1 to 7 and m equals 1 to 7 and R is alkyl, aryl, alkoxy or aryloxy;

—O—$(CH_2)_n$-aryl-$(CH_2)_m$—O—, where n equals 0 to 7 and m equals 0 to 7;

—O—$(CH_2)_n$—O-aryl-O—$(CH_2)_m$—O—, where n equals 1 to 7 and m equals 1 to 7 and;

—O—$(CH_2)_n$—N(R)-aryl-N(R)—$(CH_2)_m$—O—, where n equals 1 to 7 and m equals 1 to 7 and R is alkyl.

5. The method of claim 4 here said substituted bis-acylpyrazolone is 4,4'-nonanedioyl-bis(2,4-dihydro-5-methyl-2-phenyl-3H-pyrazol-3-one).

6. The method of claim 4 where said substituted bis-acylpyrazolone is bis(3-propyl-1-(4-carboamide-2,4-dihydro-5-methyl-2-phenyl-3H-pyrazol-3-one))-phenylphosphine oxide.

* * * * *